United States Patent [19]

Yoshimura et al.

[11] Patent Number: 5,015,667

[45] Date of Patent: May 14, 1991

[54] PRE-FOAMED BEADS OF POLYETHYLENE BASE RESIN

[75] Inventors: Shohei Yoshimura, Tomioka; Hideki Kuwabara, Hadano; Toru Yamaguchi, Utsunomiya, all of Japan

[73] Assignee: Japan Styrene Paper Corporation, Tokyo, Japan

[21] Appl. No.: 267,725

[22] Filed: Nov. 2, 1988

Related U.S. Application Data

[63] Continuation of Ser. No. 166,818, Mar. 1, 1938, abandoned, which is a continuation of Ser. No. 842,121, Mar. 20, 1986, which is a continuation of Ser. No. 662,172, Oct. 18, 1984, abandoned.

[30] Foreign Application Priority Data

Oct. 24, 1983 [JP] Japan ............................ 58-198709

[51] Int. Cl.$^5$ ............................................. C08V 9/22
[52] U.S. Cl. ...................................... 521/58; 521/56; 521/80
[58] Field of Search ........................... 521/56, 60, 58

[56] References Cited

U.S. PATENT DOCUMENTS

| | | | |
|---|---|---|---|
| 4,275,023 | 6/1981 | Shimizu et al. | 521/60 |
| 4,448,901 | 5/1984 | Senda et al. | 521/60 |
| 4,464,484 | 8/1984 | Yoshimura et al. | 521/58 |
| 4,617,323 | 10/1986 | Kuwabara et al. | 521/60 |
| 4,695,593 | 9/1987 | Kuwabara et al. | 521/60 |

*Primary Examiner*—Morton Foelak
*Attorney, Agent, or Firm*—Sherman and Shalloway

[57] ABSTRACT

A method of forming pre-foamed beads of a polyethylene-base resin are disclosed. The polyethylene-base resin has been obtained by crosslinking a starting polyethylene-base resin having a density greater than 0.940 g/cm$^3$ and the pre-foamed beads have a crosslinking degree of 10–45% gel content. The pre-foamed beads can provide a molded articles having excellent rigidity and dimensional accuracy and showing superb dimensional stability under heat.

18 Claims, No Drawings

PRE-FOAMED BEADS OF POLYETHYLENE BASE RESIN

This application is a continuation, of U.S. application Ser. No. 166,818 filed Mar. 1, 1988 which is a continuation of 842,121, filed Mar. 20, 1986 which is a continuation of 662,172, filed Oct. 18, 1984.

This invention relates to a method of forming pre-foamed beads of a polyethylene-base resin, and more specifically to pre-foamed beads of a polyethylene-base resin which beads can afford molded articles having excellent rigidity and dimensional accuracy and developing smaller thermal dimensional variations.

Molded articles obtained by molding pre-foamed beads, which have in turn been prepared by crosslinking and pre-foaming a polyethylene-base resin, into desired shapes have been widely used in recent years as heat-insulating materials, building materials, packaging containers, etc. Molded articles of the above sort are however, accompanied by such defects that although they have rather good flexibility, their rigidity are insufficient and when molded into articles of high expansion ratio, they undergo too much shrinkage to achieve high dimensional accuracy. In addition, conventional molded articles obtained from pre-foamed beads of polyethylene-base resins are poor in heat resistance and hence in dimensional stability under elevated temperatures because of the inherent nature of the resins which make up the molded articles. It was thus unable to use such molded articles at places where heat resistance of 100° C. is required, for example, for heat-insulating steam and hot water pipes or similar purposes.

The present inventors have carried out an extensive research with a view toward solving the defects of the above-described molded articles. As a result, it has been found that excellent molded articles having superb rigidity and dimensional accuracy and developing smaller thermal dimensional variations can be obtained from pre-foamed beads of a polyethylene-base resin which has been obtained by crosslinking a starting polyethylene-base resin having a specific density to a particular crosslinking degree, leading to completion of this invention.

In one aspect of this invention, there is thus provided pre-foamed beads of a polyethylene-base resin, characterized in that the polyethylene-base resin has been obtained by crosslinking a starting polyethylenebase resin having a density greater than 0.940 g/cm³ and the pre-foamed beads have a crosslinking degree of 10–45% gel content.

In the present invention, the pre-foamed beads are formed of a resin obtained by crosslinking a starting polyethylene-base resin having a density $\rho$ of at least 0.940 g/cm³. For example, the former resin may be obtained by crosslinking an ethylene homopolymer, an ethylene-propylene, ethylene-butene or ethylene-pentene copolymer or the like, the density of which satisfies the following inequality:

$$\rho > 0.940 \text{ g/cm}^3$$

If the density $\rho$ should be 0.940 or lower, the rigidity and heat resistance of resultant molded articles will be insufficient. Therefore, such a lower density is not preferred.

In the present invention, the density $\rho$ may preferably range from 0.940 g/cm³ (exclusive) to 0.970 g/cm³ (inclusive), i.e., may preferably fall within the following range:

$$0.940 \text{ g/cm}^3 < \rho \leq 0.970 \text{ g/cm}^3$$

The resin, which makes up the pre-foamed beads of this invention, must have a gel content of 10–45%.

If the crosslinking degree of the pre-foamed beads should be such a level as not reaching 10% gel content, the resulting molded articles will have large compression set. On the other hand, any gel contents greater than 45% will make the foaming operation difficult and will be unable to provide molded articles having good surface quality and sufficient melt-bonding between individual beads.

The term "the gel content of pre-foamed beads" as used herein means the percentage of the weight of xylene-insoluble matters to the initial weight of pre-foamed beads when the pre-foamed beads are allowed to stand and age under atmospheric pressure to substitute a blowing agent contained in the pre-foamed beads with air and are then boiled for 8 hours in boiling xylene.

In the present invention, the resin which makes up the pre-foamed beads is a resin obtained by crosslinking a starting polyethylene-base resin having a density $\rho$ of greater than 0.940 g/cm³. The crosslinking of the starting polyethylene-base resin may be effected in the presence of a chemical crosslinking agent or under exposure to electron beams. When crosslinked under exposure to electron beams, the crosslinking and foaming steps are carried out in separate apparatus. When a chemical crosslinking agent is relied upon, the crosslinking and foaming steps may be carried out in different apparatus or in the same apparatus. The crosslinking and foaming steps may for example be effected by crosslinking a starting bead-like resin in an autoclave, charging the thuscrosslinked bead-like resin in a different autoclave, charging a foaming agent under pressure, adjusting the temperature of the autoclave to a foaming temperature, and then releasing the contents from the autoclave into atmosphere of a lower pressure so as to cause the above-crosslinked bead-like resin to expand. Alternatively, the crosslinking and foaming steps may also be effected by charging a starting bead-like resin in an autoclave, crosslinking the bead-like resin there, charging a foaming agent under pressure in the same autoclave, adjusting the temperature of the autoclave to a foaming temperature, and then releasing the contents into an atmosphere of a lower pressure so as to cause the thus-crosslinked bead-like resin to expand.

As such a chemical crosslinking agent, may be employed dicumylperoxide, di-t-butylperoxide, t-butylcumylperoxide, α,α-bis(t-butylperoxy)-p-diisopropylbenzene, 2,5-dimethyl-2,5-di(t-butylperoxy)-hexyne-3, 2,5-dimethyl-2,5-di(benzoylperoxy)hexane, or the like. The amount of such a chemical crosslinking agent to be added may vary depending on the type of the chemical crosslinking agent, the desired crosslinking degree and the like. It may generally be used in an amount of 0.1–2.0 parts by weight per every 100 parts by weight of the resin.

In the present invention, the internal pressure decreasing velocity coefficient k of pre-foamed beads may preferably be at most 0.35 at 25° C. and 1 atm.

By the term "internal pressure decreasing velocity coefficient k at 25° C. and 1 atm." as used herein, is meant a velocity coefficient of a velocity at which a gas flows out of pre-foamed beads. It is determined in the following manner. Namely, pre-foamed beads of known expansion ratio and weight which have been fully aged in the atmosphere are placed for example in a polyethylene film bag of 70 mm × 102 mm through which a number of needle holes have been formed. The pre-foamed beads are then placed in a pressure-resistant vessel while still contained in the above bag. While maintaining the interior of the vessel at 25° C., the interior of the vessel is pressurized by air to impart an internal pressure of 2 kg/cm$^2$(G) - 1 kg/cm$^2$(G) to the pre-foamed beads. The pre-foamed beads are taken out of the pressureresistant vessel and their total weight is then measured. Thereafter, the pre-foamed beads are held at 25° C. and 1 atm. Upon an elapsed time of 10 minutes, the total weight of the pre-foamed beads is again measured. The internal pressure $P_o$ kg/cm$^2$(G) of the pre-foamed beads at a time point immediately after the application of the internal pressure and the internal pressure $P_l$ kg/cm$^2$(G) of the same prefoamed beads at a time point after held for 10 minutes at 25° C. and 1 atm. are each determined in accordance with the following equation.

Internal pressure of pre-foamed beads (Kg/cm$^2$ · G) =

$$\frac{\text{Weight of increased air (g)} \times 0.082 \times T(K) \times 1.0332}{\text{M.W. of air} \times \text{Volume of air in beads } (l)}$$

Where the weight of increased air is a difference in weight between the weight of the beads upon measurement of their internal pressures and that prior to their pressurizing treatment, T is the temperature of the gas, and the volume of air in the beads is a value calculated from the expansion ratio of the pre-foamed beads.

Based on $P_o$ and $P_l$ determined in accordance with the above equation, the internal pressure decreasing velocity coefficient k is calculated in accordance with the following equation.

$$\log \frac{P_1}{P_2} = -kt$$

where t means time (1/6 hour in the above case).

The internal pressure decreasing velocity coefficient k is 0.35 or smaller (i.e., k≦0.35) where pre-foamed beads contain fewer voids, contain closed cells in a higher proportion or have thick skins. Where k>0.35, resulting molded articles are susceptible to considerable shrinkage. Thus, it is not preferred to use pre-foamed beads having such a high k value.

One embodiment of the production process of pre-foamed beads of this invention and one embodiment of the production method of a molding from the pre-foamed beads will next be described.

First of all, starting beads of a polyethylenebase resin and a chemical crosslinking agent, the latter being in an amount of 0.1-2.0 parts by weight per 100 parts by weight of the former, are dispersed in a dispersion medium and are then heated with stirring, thereby crosslinking the starting beads.

As the dispersion medium, any solvent may be used so long as it does not dissolve the resin, including water, ethylene glycol, glycerin, methanol, ethanol, etc. Water is however used usually. The heating temperature may vary depending on the melting point of a resin to be used or the type of a chemical crosslinking agent to be relied upon. However, it may generally range from 130°-180° C. The polyethylenebase resin can be crosslinked by heating it for about 0.5-5 hours with stirring in the above manner.

Upon performing the above crosslinking step, it is also possible to incorporate a dispersing agent, for example, particulate aluminum oxide or titanium oxide, basic magnesium carbonate, basic zinc carbonate, calcium carbonate or the like.

Then, the thus-crosslinked beads of the polyethylene-base resin are foamed. The foaming may be effected by dispersing the thus-crosslinked beads of the polyethylene-base resin together with a foaming agent in a dispersion medium in a closed vessel, heating the resulting dispersion to a temperature in the range of from (the melting point of the resin − 2° C.) to (the melting point of the resin + 30° C.), and then releasing the bead-like resin and dispersion medium into an atmosphere of a pressure lower than the internal pressure of the vessel so as to cause the bead-like resin to expand. As the above foaming agent, may be mentioned an inorganic foaming agent such as carbon dioxide or the like, or a volatile foaming agent such as propane, butane, pentane, hexane, dichlorodifluoromethane, dichlorotetrafluoroethane or the like. Two or more of these foaming agents may be used in combination. The above-foaming agent may be used in an amount of 0.15-0.40 mole per every 100 g of the bead-like resin. On the other hand, the same dispersion medium as that employed above upon the crosslinking of the starting resin may be used as a dispersion medium in the foaming step.

Furthermore, a dispersing agent may also be used in the foaming step. A dispersing agent similar to that employed above in the crosslinking step may be used in the foaming step.

Pre-foamed beads which have been obtained in the above manner are then subjected to a pressurizing treatment by the above-mentioned inorganic gas or a mixed gas of an inorganic gas and volatile gas to impart an internal pressure of 0.5-5 kg/cm$^2$(G) to the pre-foamed beads. Then, the resultant pre-foamed beads are filled in a mold, followed by their heating with steam of 1.5-5 kg/cm$^2$(G) or the like so that the pre-foamed beads are foamed and expanded to meltbond the beads together. Thus, a molded articles conforming the internal shape of the mold have been obtained from the pre-foamed beads of the polyethylenebase resin.

In the pre-foamed beads of this invention, the polyethylene-base resin has been obtained as mentioned above, namely, by crosslinking a starting polyethyleneresin having a density ρ greater than 0.940 g/cm$^3$ to such a degree that the resulting pre-foamed beads have a crosslinking degree of 10–45% gel content. Therefore, molded articles obtained by molding the pre-foamed beads of this invention in a mold are excellent not only in rigidity and dimensional accuracy but also in heat resistance. Unlike molded articles of conventional pre-foamed beads of polyethylene-base resins, the above-obtained molded articles are free from such a danger that its dimensions would change under heat. Hence, the molded articles obtained from the pre-foamed beads of this invention can withstand dimensional change even when used at elevated temperatures.

This invention will hereinafter be described in further detail by the following Examples.

Examples 1-7 & Comparative Examples 1-7

After crosslinking a bead-like ethylene homopolymer having a density given in Table 1 with dicumylperoxide, 100 parts of the thus-crosslinked beads, 300 parts of water and dichlorodifluoromethane, which was in an amount shown in Table 1, were mixed in a closed vessel. The contents were heated with stirring to a foaming temperature shown in Table 1, at which the contents were held for 30 minutes. Then, while maintaining the internal pressure of the vessel at 35 kg/cm$^2$(G) with nitrogen gas, one end of the vessel was opened to release the bead-like resin and water under atmospheric pressure, thereby causing the bead-like resin to expand.

were placed in a pressure tank, in which they were subjected for 48 hours to a pressurizing treatment with air of 2 kg/cm$^2$(G).

The thus-pressurized pre-foamed beads were filled in a mold of 300 mm×300 mm×50 mm (internal dimensions) and were then heated with steam of a pressure given in Table 2 to obtain molded articles. The thus-obtained molded articles were dried and aged for 60 hours in an oven of 55° C. Its various properties were then measured. Results are given in Table 2.

TABLE 1

|   | Density of uncrosslinked polyethylene (g/cm$^3$) | Amount of dichloro-difluoro-methane (parts) | Foaming temperature (°C.) | Gel content of pre-foamed beads (%) | Internal pressure decreasing velocity coefficient (k) | Apparent expansion ratio of pre-foamed beads (times) |
|---|---|---|---|---|---|---|
| Example |   |   |   |   |   |   |
| 1 | 0.944 | 35 | 127 | 13 | 0.33 | 30 |
| 2 | 0.944 | 35 | 130 | 30 | 0.29 | 25 |
| 3 | 0.952 | 35 | 145 | 17 | 0.33 | 15 |
| 4 | 0.952 | 35 | 143 | 35 | 0.31 | 42 |
| 5 | 0.952 | 35 | 144 | 43 | 0.32 | 30 |
| 6 | 0.964 | 30 | 151 | 16 | 0.30 | 31 |
| 7 | 0.964 | 30 | 153 | 40 | 0.31 | 45 |
| Comparative Example |   |   |   |   |   |   |
| 1* | 0.944 | 35 | 128 | 8 | 0.38 | 27 |
| 2 | 0.944 | 35 | 135 | 48 | 0.30 | 30 |
| 3* | 0.952 | 35 | 145 | 9 | 0.36 | 20 |
| 4 | 0.952 | 35 | 145 | 47 | 0.28 | 23 |
| 5 | 0.952 | 35 | 150 | 60 | 0.29 | 35 |
| 6* | 0.964 | 30 | 151 | 5 | 0.37 | 35 |
| 7 | 0.964 | 30 | 153 | 50 | 0.26 | 37 |

*Pre-foamed beads contained open cells.

TABLE 2

|   | Pressure of molding steam (kg/cm$^2$ · G) | Properties of molding |   |   |   |   |   |
|---|---|---|---|---|---|---|---|
|   |   | Dimensional accuracy[1] | Thermal[2] dimensional variations | Compressive hardness[3] | Compression set (%)[4] | Water absorption[5] | evaluation evaluation |
| Example |   |   |   |   |   |   |   |
| 1 | 3.0 | O | O | 1.3 | 3.5 | O | O |
| 2 | 3.0 | O | O | 2.0 | 3.2 | O | O |
| 3 | 3.2 | O | O | 3.7 | 3.3 | O | O |
| 4 | 3.2 | O | O | 0.76 | 4.2 | O | O |
| 5 | 3.2 | O | O | 1.4 | 3.6 | O | O |
| 6 | 3.5 | O | O | 1.55 | 3.9 | O | O |
| 7 | 3.5 | O | O | 0.92 | 4.0 | O | O |
| Comparative Example |   |   |   |   |   |   |   |
| 1 | 3.0 | Measurement was unfeasible due to excess shrinkage. |   |   |   |   | X |
| 2 | 3.0 | Measurement was unfeasible due to poor melt-bonding. |   |   |   |   | X |
| 3 | 3.2 | X | O | 1.3 | over 10 | X | X |
| 4 | 3.2 | O | O | 3.5 | 3.6 | X | X |
| 5 | 3.2 | Measurement was unfeasible due to poor melt-bonding. |   |   |   |   | X |
| 6 | 3.5 | X | O | 0.95 | over 10 | X | X |
| 7 | 3.5 | O | O | 1.3 | 3.9 | X | X |

Note:
[1] After dried for 60 hours in the oven of 55° C. subsequent to molded articles, the percentage shrinkage of the molded articles in the plane direction of the mold was expressed in accordance with the following standard.
less than 4% ... O
4% and up ... X
[2] Following the procedure of JIS(Japanese Industrial Standard)-K6767, the thermal dimensional change at the measurement temperature of 100° C. was evaluated in accordance with the following standard.
less than 5% ... O
5% and up ... X
[3] Measured in accordance with JIS-K6767.
[4] Measured in accordance with JIS-K6767.
[5] Measured in accordance with JIS-K6767B. The water absorption was expressed in accordance with the following standard.
less than 0.005 g/cm$^3$ ... O
0.005 g/cm$^3$ and up ... X.

After allowing the thusobtained pre-foamed beads to stand for 24 hours under atmospheric pressure, the gel content of the pre-foamed beads was measured The gel content and expansion ratio of the pre-foamed beads are given in Table 1. Thereafter, the pre-foamed beads

Having now fully described the invention, it will be apparent to one of ordinary skill in the art that many changes and modifications can be made thereto without departing from the spirit or scope of the invention as set forth herein.

We claim:

1. A method of forming prefoamed beads with a crosslinking degree of 10 to 45% gel content, comprising the steps of:
   chemically crosslinking a starting bead-like polyethylene-base resin having a density greater than 0.940 g/cm³ to a crosslinking degree of 10 to 45% gel content;
   charging the crosslinked bead-like polyethylene-base resin, a foaming agent and a dispersion medium into a closed vessel;
   agitating and heating the resulting admixture at a temperature of from (the melting point of the resin $-2°$ C.) to (the melting point of the resin $+30°$ C.); and
   releasing the crosslinked bead-like polyethylene-base resin and dispersion medium into an atmosphere of a pressure lower than the internal pressure of the closed vessel thereby causing the crosslinked bead-like polyethylene-base resin to expand by an apparent expansion ratio in the range of from at least 15 to about 45.

2. A method as defined in claim 1 wherein said crosslinking step and said foaming step are performed in the same vessel.

3. A method as defined in claim 1 wherein said crosslinking step and said foaming step are performed in different vessels.

4. A method as defined in claim 1 wherein said crosslinking step includes adding a crosslinking agent to the starting polyethylene-base resin; dispersing the polyethylene-base resin and the crosslinking agent in a dispersing medium; and heating while simultaneously agitating the dispersion to a temperature sufficient to provide crosslinking.

5. A method as defined in claim 4 wherein said dispersing step includes adding a dispersing agent selected from the group consisting of particulate aluminum oxide, titanium oxide, basic magnesium carbonate, basic zinc carbonate, and calcium carbonate.

6. A method as defined in claim 1 wherein said crosslinking step includes exposing the starting polyethylene-base resin to electron beams.

7. A method as defined in claim 1 wherein the polyethylene-base resin is selected from the group consisting of ethylene homopolymer, ethylene-propylene copolymer, ethylene-butene copolymer and ethylene-pentene copolymer.

8. A method as defined in claim 7 wherein said polyethylene-base resin contains ethylene in an amount of at least 95 weight-%.

9. A method as defined in claim 1 wherein the density $\rho$ of the starting polyethylene-base resin is in accordance with the following relation:

$$0.940 \text{ g/cm}^3 < \rho \leq 0.970 \text{ g/cm}^3$$

10. A method as defined in claim 4 wherein said crosslinking agent is selected from the group consisting of dicumylperoxide, di-t-butylperoxide, t-butylcumylperoxide, $\alpha,\alpha$-bis(t-butylperoxy)-p-diiospropylbenzene, 2,5-dimethyl-2,5-di(t-butylperoxy)-hexyne-3, and 2,5-dimethyl-2,5-di(benzoylperoxy)hexane.

11. A method as defined in claim 4 wherein said crosslinking agent is added in an amount of 0.1–2.0 parts by weight per 100 parts of the polyethylene-base resin.

12. A method as defined in claim 4 wherein said heating step is performed at a temperature range of 130°–180° C. over a period of about 0.5 to 5 hours.

13. A method as defined in claim 4 wherein said dispersing medium is selected from the group consisting of water, ethylene glycol, glycerin, methanol, and ethanol.

14. A method as defined in claim 1 wherein the prefoamed beads have an internal pressure decreasing velocity coefficient k of at most 0.35 at 25° C. and 1 atm.

15. A method as defined in claim 1 wherein the foaming agent is carbon dioxide.

16. A method as defined in claim 1 wherein the foaming agent is selected from the group consisting of propane, butane, pentene, hexane, dichlorodifluoromethane, and dichlorotetrafluoroethane.

17. A method as defined in claim 1 wherein said foaming step includes adding the charging agent in an amount of 0.15–0.40 mole per 100 g of the bead-like resin.

18. A method as defined in claim 1 wherein said dispersing medium is selected from the group consisting of water, ethylene glycol, glycerin, methanol, and ethanol.

* * * * *